United States Patent [19]
Nakai et al.

[11] Patent Number: 5,712,683
[45] Date of Patent: Jan. 27, 1998

[54] LEVEL ADJUSTING CIRCUIT OF COLOR IMAGE SIGNAL

[75] Inventors: Tomomichi Nakai, Ogaki; Toshio Nakakuki, Gifu-ken, both of Japan

[73] Assignee: Sanyo Electric Co., Ltd., Moriguchi, Japan

[21] Appl. No.: 619,896

[22] Filed: Mar. 6, 1996

[30] Foreign Application Priority Data

Mar. 16, 1995  [JP]  Japan ................................ 7-057393

[51] Int. Cl.⁶ .................... H04N 9/64; H04N 9/68; H04N 5/52
[52] U.S. Cl. .................... 348/256; 348/645; 348/679; 348/708
[58] Field of Search ................................ 348/255, 256, 348/645, 646, 679, 708, 222, 253; 358/515, 516; H04N 9/64, 5/52, 9/68

[56] References Cited

U.S. PATENT DOCUMENTS

| | | | |
|---|---|---|---|
| 5,089,882 | 2/1992 | Kaye et al. | 358/28 |
| 5,233,410 | 8/1993 | Fairhurst | 358/22 |
| 5,274,439 | 12/1993 | Dischert et al. | 358/27 |
| 5,563,666 | 10/1996 | Suzuki | 348/645 |

*Primary Examiner*—Andrew Faile
*Assistant Examiner*—Ngoc-Yen Vu
*Attorney, Agent, or Firm*—Sheridan Ross P.C.

[57] ABSTRACT

A signal level adjusting circuit for performing adjustment of signal levels in which the levels of individual image signals are made uniform so as to provide greater use of a dynamic range on an image sensor without deterioration to resolution.

9 Claims, 4 Drawing Sheets

LEVEL ADJUSTING CIRCUIT OF COLOR IMAGE SIGNAL

BACKGROUND OF THE INVENTION

1. Field of the Invention

The present invention relates generally to an apparatus for processing image information represented by various types of color components. More particularly, the invention relates to a circuit for adjusting the levels of digital image data signals of individual color components which are continuously produced in an image processing apparatus.

2. Description of the Related Art

In general, an image sensing apparatus has one image sensor (or image sensing element) including a CCD (Charge Coupled Device) or a plurality of those image sensors. The image sensor has a light receiving section having a matrix of multiple pixels. When a color image is picked up using a single CCD image sensor, a color filter having a plurality of color components arranged in a stripe or mosaic form is mounted on the front side of the light receiving section of that image sensor. For example, a color filter is designed to have three color components, green (G), yellow (Ye) and cyan (Cy), arranged in a stripe form. The light receiving section can therefore have a plurality of pixel groups each consisting of three pixels that respectively correspond to a G filter section, a Ye filter section and a Cy filter section. This color filter structure permits the image sensor to continuously output analog image data signals, represented by individual color components, in a predetermined order.

The image sensing apparatus further includes an A/D converter, a signal level adjusting circuit and a signal processor. The A/D converter converts each analog image data signal to a digital image data signal pixel by pixel. The level adjusting circuit adjusts the levels of the individual image data signals, color component by color component. The signal processor combines the adjusted image signals by a predetermined ratio to produce luminance signals and performs matrix processing on the adjusted image signals to produce chromatic signals. Further, the signal processor combines the luminance signals and the chromatic signals to produce television signals that match a predetermined format.

FIG. 1 is a block circuit diagram showing a conventional level adjusting circuit 104. For the simplification of the description, FIG. 1 depicts only the circuit that is associated with luminance signals. The level adjusting circuit 104 includes a color distributor 101, a multiplier 102 and a multiplexer 103. The color distributor 101 distributes image signals (continuously output from the A/D converter) for the individual G, Ye and Cy color components in response to a switch pulse signal supplied from a timing controller (not shown). This switch pulse signal is produced based on a reference clock signal. For instance, the color distributor 101 separates image signals to the three color components of G, Ye and Cy every three clock periods, and distributes the separated image signals to the multiplier 102. To reduce the variation in the levels of image signals between individual color components which is caused by the variation in the optical characteristic of the CCD image sensor in use, the multiplier 102 multiplies each image signal by a specific coefficient. The multiplexer 103 multiplexes the image signals of individual color components, output from the multiplier 102 using procedures that reverse those carried out by the color distributor 101. Accordingly, the multiplexer 103 continuously outputs image signals of individual color components in a predetermined order.

To simplify the manufacturing steps, the G filter section of a stripe-shaped color filter having G, Ye and Cy color components is formed by partially overlapping the Ye filter section and Cy filter section. In this case, the amount of incident light to a pixel corresponding to a G component is reduced so that the sensitivity of that pixel drops to about a half of the sensitivities of pixels corresponding to Ye and Cy components. The average level of the image signal of a G component therefore becomes lower than those of the other color components. In this respect, therefore, the multiplier 102 multiplies an image signal of the G component by "2" and multiplies image signals of the Ye and Cy components by "1", as shown in FIG. 1. The multiplication coefficients are finely set in such a manner so that the average level of a specific color component (G in this case) approaches the average levels of the other color components (Ye and Cy in this case).

Further, a variation in the sensitivity of each pixel for the associated color component causes a variation in the amount of incident light up to the point when the output voltage for each pixel reaches the saturation level. As shown in FIG. 2, the output voltages for individual pixels corresponding to the Ye and Cy filter sections reach the saturation level Vs at a first amount of incident light A. The output voltage for a pixel corresponding to the G filter section reaches the saturation level Vs at a second amount of incident light B, which is twice as much as the first amount of incident light A. This variation in sensitivity varies the levels of image signals of the individual color components. As a result, when an image is reproduced on a display screen, a so-called moire is apt to occur, which disturbs the contour of a target object. To suppress the occurrence of the moire, the level adjusting circuit 104 adjusts the levels of image signals of the individual color components so that the sensitivities of individual pixels corresponding to the individual color components appear to be uniform.

Because the level adjusting circuit 104 multiplies image signals corresponding to the individual color components by respective and different coefficients, however, the saturation levels of the individual image signals may not be the same. When individual pixels corresponding to the G, Ye and Cy components have the characteristics as shown in FIG. 2, for example, the level adjusting circuit 104 multiplies an image signal of the G component by "2" and multiplies image signals of the Ye and Cy components by "1". Then, the saturation level Dsa for the image signals of the Ye and Cy components become a half of the saturation level Dsb for the G component, as shown in FIG. 3. This makes it impossible for the level adjusting circuit 104 to perform such level adjustment. At the time of receiving the individual image signals from the level adjusting circuit 104 and producing luminance signals, therefore, the signal processor cannot properly execute arithmetic operations. Consequently, a moire is likely to appear on an image to be reproduced on the display screen.

As a solution to this shortcoming, the levels of the individual color components may be clipped to lower levels than its saturation level to prevent the imbalance of the levels of the color components, i.e., before the Ye or Cy component reaches its saturation level. However, with this scheme, the dynamic range of the CCD image sensor is not effectively utilized and the resolution is undesirably deteriorated.

SUMMARY OF THE INVENTION

Broadly speaking, the present invention relates to an image signal level adjusting circuit which reduces a variation in the levels of image signals of individual color components. The present invention can be implemented in numerous ways.

According to one embodiment of the invention, a level adjusting circuit for continuously receiving a plurality of image data signals corresponding to a plurality of color components and adjusting levels of the plurality of image signals color component by color component, includes: a color distributor for distributing the received plurality of image signals in accordance with color components; a multiplier for multiplying the distributed image signals by specific gains to average the levels of the distributed image signals; a level clipping circuit for clipping the gain multiplied image signals in such a way that levels of the gain multiplied image signals become less than or equal to a predetermined level, each of the gain multiplied image signals to be subjected to the level clipping has a level greater than or equal to the predetermined level; an arithmetic operation circuit for performing an arithmetic operation to subtract the predetermined level from one of the gain multiplied image signals corresponding to one of said plurality of color component and to multiply a resultant value by a predetermined coefficient, the arithmetic operation circuit receives from the multiplier the gain multiplied image signal likely to undergo the level clipping from among the gain multiplied image signals; and an adder for adding an operation result from the arithmetic operation circuit to the image signals from the level clipping circuit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which.

DETAILED DESCRIPTION OF THE PREFERRED EMBODIMENT

Figure 4:
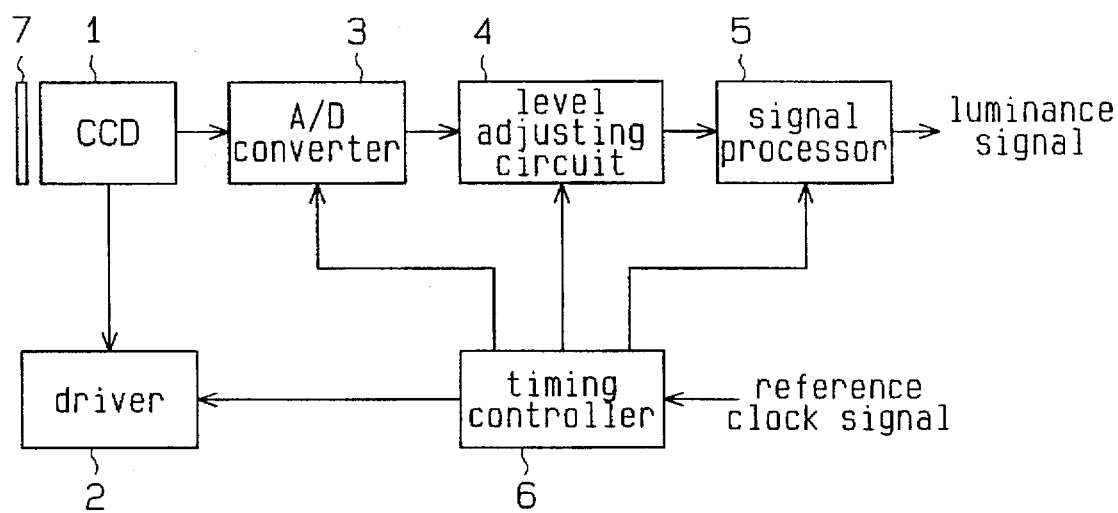
FIG. 4 is a block diagram showing an image sensing apparatus.

A preferred embodiment of the present invention will be now described with reference to the accompanying drawings. According to this embodiment, the present invention is adapted to an image sensing apparatus as shown in FIG. 4. For the sake of the simplification of the description, the description of the circuit in the image sensing apparatus shown in FIG. 4 that is associated with the processing of color signals is omitted.

The image sensing apparatus comprises a CCD image sensor 1, a driver 2, an A/D converter 3, a signal level adjusting circuit 4, a signal processor 5 and a timing controller 6. The timing controller 6 produces a horizontal sync signal and a vertical sync signal based on a reference clock signal and supplies them to the individual circuits 2 to 5. The timing controller 6 further produces a switch pulse signal based on the reference clock signal and supplies it to the level adjusting circuit 4.

The CCD image sensor 1 has a light receiving section which has a matrix of multiple pixels, and on the front side of which a color filter 7 having three color components of green (G), yellow (Ye) and cyan (Cy), arranged in a stripe form is mounted. The light receiving section can therefore have a plurality of pixel groups each consisting of three pixels that respectively correspond to a G filter section, a Ye filter section and a Cy filter section. In this embodiment, the G filter section of the color filter 7 is formed by partially overlapping the Ye filter section and Cy filter section. Therefore, the amount of incident light to a pixel corresponding to the G component is smaller than the amounts of incident light to pixels corresponding to the Ye and Cy components.

The driver 2 generates a multi-phase clock pulse signal in response to the horizontal sync signal and vertical sync signal and supplies it to the CCD image sensor 1. The CCD image sensor 1 further has an output section to which the light receiving section sequentially transfers information charges, accumulated in the individual pixels, in accordance with the multi-phase clock pulse signal. The output section converts the information charges to voltage values and continuously supplies analog image data signals corresponding to the individual pixels to the A/D converter 3 line by line. Because one pixel of image data represents one color component, the individual analog image data signals are supplied to the A/D converter 3 in the arrangement order of the color components in the color filter 7. The A/D converter 3 converts each analog image data signal to a digital image data signal pixel by pixel.

The signal level adjusting circuit 4 adjusts the levels of the digital image signals of the individual color components, color component by color component, in such a way that the average levels of those digital image signals become the same. The signal processor 5 combines the adjusted image signals by a predetermined ratio to produce luminance signals. The operations of the individual circuits 2 to 5 in synchronism with the reference clock signal allows image signals to be converted pixel by pixel from image data output from the CCD image sensor 1 and allows the accurate processing on those image signals.

Figure 5:
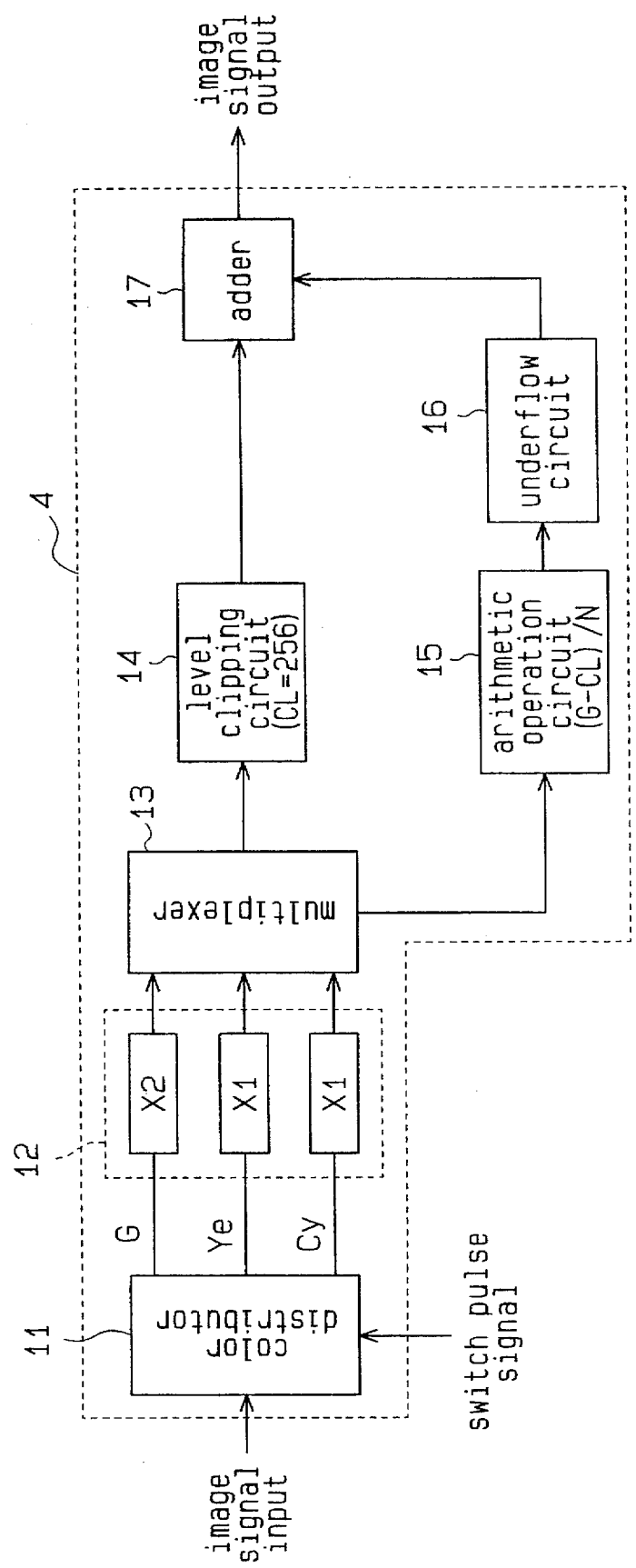
FIG. 5 is a block diagram showing a level adjusting circuit according to one preferred embodiment of the invention.

FIG. 5 is a block circuit diagram showing the level adjusting circuit 4. The level adjusting circuit 4 has a color distributor 11, a multiplier 12, a multiplexer 13, a level clipping circuit 14, an arithmetic operation circuit 15, an under-flow circuit 16 and an adder 17. The color distributor 11 separates image signals, continuously output from the A/D converter 3, for the individual G, Ye and Cy color components in a time-divisional manner in response to the switch pulse signal supplied from the timing controller 6, and distributes the separated image signals to the multiplier 12. The multiplier 12 multiplies each image signal by a specific coefficient (or gain). In some cases, to accurately show the multiplication results, the multiplier 12 produces an output data signal having a greater number of bits than the number of bits of the input data signal and supplies the produced signal to the multiplexer 13. When the multiplication coefficient is "2", for example, the input data signal is shifted by one bit to the most significant bit side so that the number of bits of the output data signal becomes greater by one bit than the number of bits of the input data signal. The multiplexer 13 multiplexes the image signals of the individual color components, output from the multiplier 12, in the reverse procedures to those executed by the color distributor 11. Accordingly, the multiplexer 13 continuously outputs a series of image signals of the individual color components in a predetermined order.

The level clipping circuit 14 clips an image signal among the individual image signals output from the multiplexer 13, which has a higher level than a predetermined level (the image signal of the G component in this case), so that the level of the image signal becomes equal to or lower than the predetermined level. This predetermined clip level is so set as to be coincident with the smallest one of the saturation levels for image signals of the individual color components (the saturation levels after the multiplication by the respective coefficients by the multiplier 12). The image signal, which corresponds to a pixel showing the highest light sensitivity and which corresponds to the color component that is multiplied by the smallest coefficient by the multiplier 12, has this minimum saturation level. In the case where the multiplier 12 receives 8-bit image signals, and multiplies the G component by "2" and the Ye and Cy components by "1" to produce 9-bit image signals, for example, the clip level is set as follows. In this case, because the saturation level for the G component is "512" and the saturation levels for the Ye and Cy components are "256", the clip level CL is set to "256" or smaller.

Figure 6:
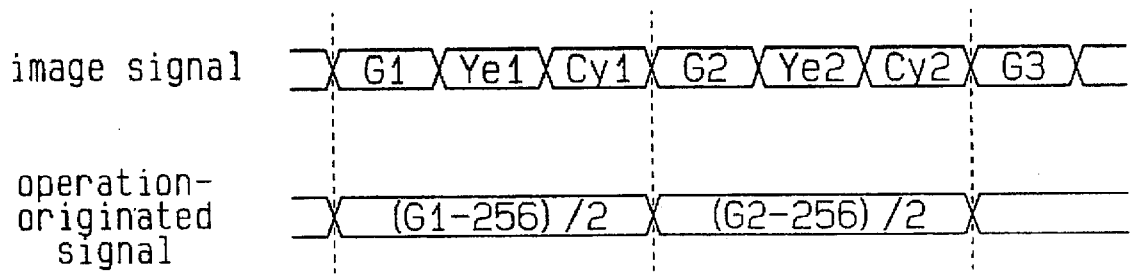
FIG. 6 is a timing chart illustrating the relationship between image signals and signals resulting from arithmetic operations.

The arithmetic operation circuit 15 selectively receives one of the image signals which is associated with the color component having the highest saturation level (G component in this case) from the multiplexer 13. That is, the selected image signal is such a signal whose average level before the multiplication by the respective coefficient is the lowest. The arithmetic operation circuit 15 then subtracts the clip level CL, set by the level clipping circuit 14, from the data of the received image signal and multiplies the resultant value (i.e., excess signal level) by a smaller coefficient than "1". If the clip level CL is set to "256", for example, the value obtained by subtracting the clip level CL "256" from the G component is multiplied by "½" or "¼". At this time, the subtracted resultant is shifted by one bit or two bits to the less significant bit side. This coefficient may of course be a value other than "½" or "¼". The arithmetic operation circuit 15 further holds the operation result for the G component for a period of three clocks as shown in FIG. 6. Alternatively, the subtraction and multiplication for the G component may be repeated three times during the 3-clock period. The under-flow circuit 16 determines whether the operation result from the arithmetic operation circuit 15 is positive or negative. When the operation result is positive, the under-flow circuit 16 sends a signal representing the operation result directly to the adder 17, whereas when the operation result is negative, the circuit 16 replaces the operation result with a signal representing "0" and sends the signal to the adder 17. Therefore, the supply of the operation result from the arithmetic operation circuit 15 is inhibited while the level of the image signal of the G component reaches the clip level CL, and it is permitted when that level exceeds the clip level CL.

The adder 17 adds a signal representing the operation result from the under-flow circuit 16 to the level-clipped image signal output from the level clipping circuit 14. When the image signal of the G component exceeds the clip level CL, the operation result from the arithmetic operation circuit 15 is effectively added to each image signal by the adder 17. When the image signal of the G component is equal to or lower than the clip level CL, on the other hand, each image signal directly passes through the adder 17. This feature allows for a quasi increase in the levels of Ye and Cy components in proportion to an increase in the level of the G component even though the image signals of the former two components have already reached the saturation level in the level clipping circuit 14.

Figure 1:
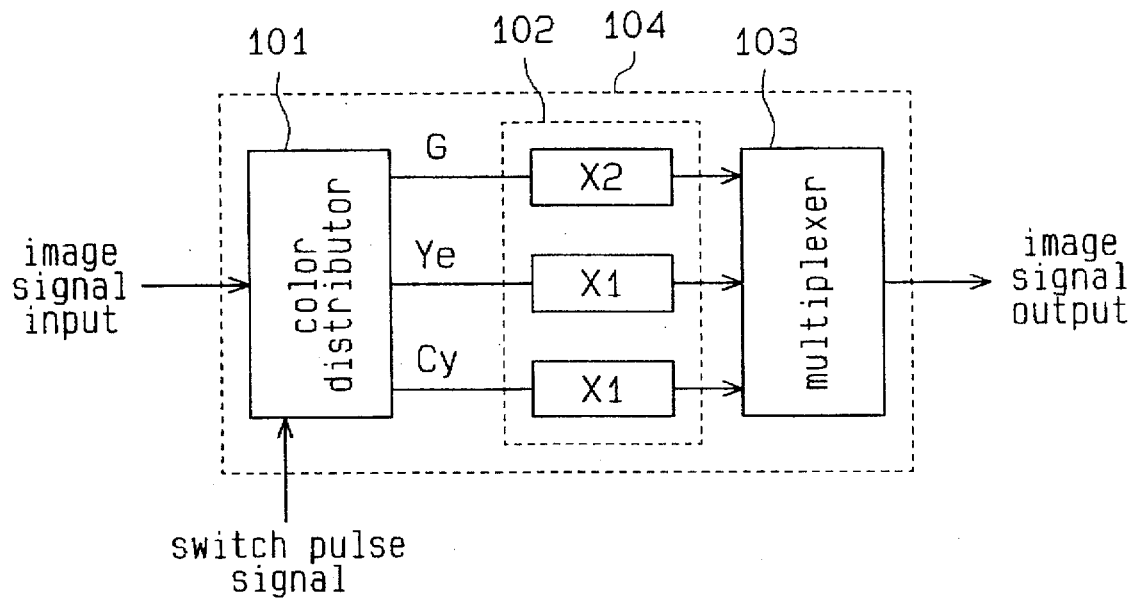
FIG. 1 is a block diagram showing a conventional level adjusting circuit.
Figure 2:
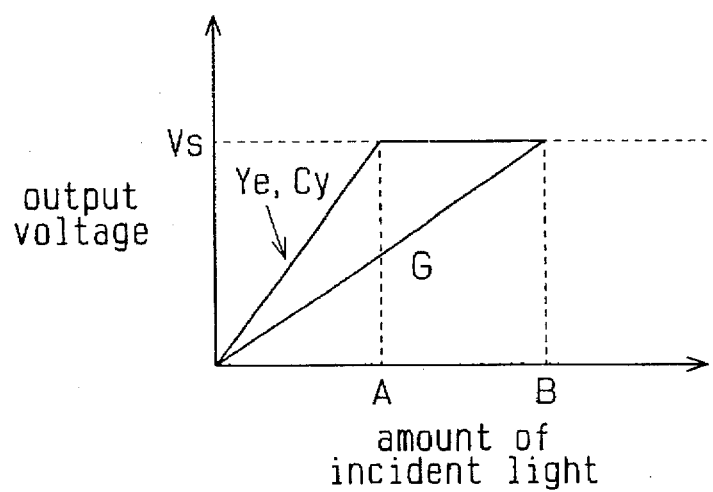
FIG. 2 is a graph showing the relationship between the output voltages of individual pixels of an image sensor and the amounts of incident light to those pixels.
Figure 3:
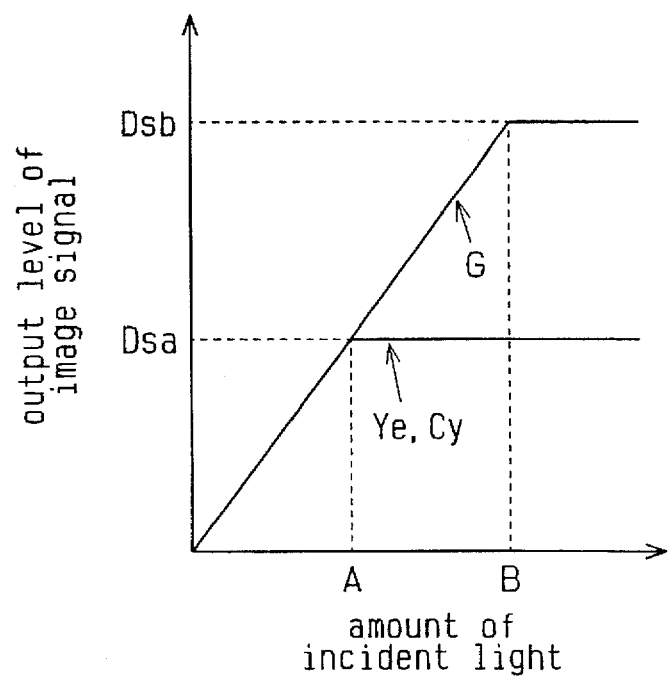
FIG. 3 is a graph showing the relationship between the levels of individual image signals output from the level adjusting circuit and the amounts of incident light to the individual pixels.
Figure 7:
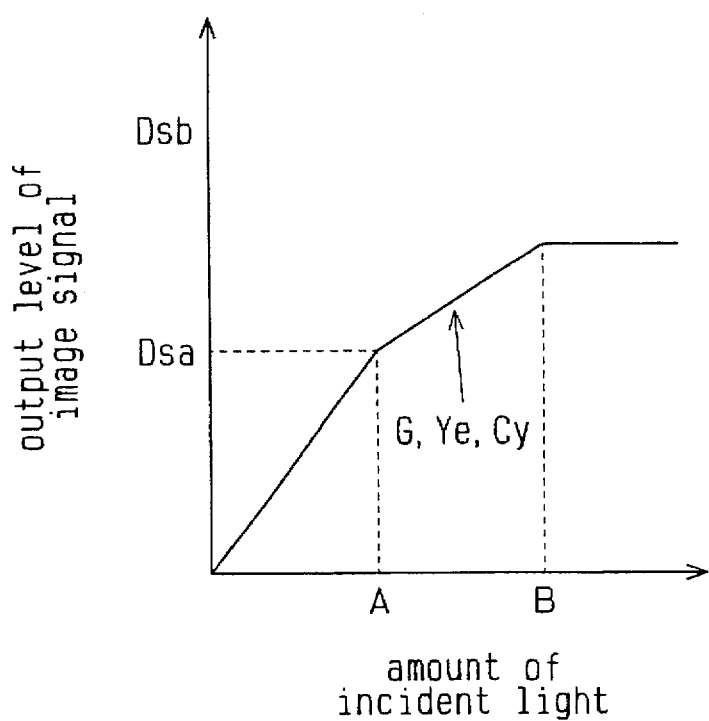
FIG. 7 is a graph showing the relationship between the levels of individual image signals output from the level adjusting circuit of the embodiment and the amounts of incident light to the individual pixels.

When the pixels of the CCD image sensor 1 corresponding to the individual color components have different optical characteristics as shown in FIG. 2, for example, the levels of the individual image signals output from the adder 17 will not be saturated until the level of the G component reaches the saturation level Dsb at the amount of incident light B as shown in FIG. 7. When the amount of incident light exceeds the amount A at which the levels of the image signals of the Ye and Cy components become the saturation level Dsa, those signals are replaced with the image signal of the G component. As the image signals output from the adder 17 are used to produce luminance signals, however, the quality of the image that is reproduced on the display screen is not deteriorated. In short, this embodiment can reduce a variation in the levels of the individual image signals to provide uniform levels while effectively using the dynamic range of the CCD image sensor 1. It is therefore possible to prevent the resolution from decreasing and suppress the occurrence of a moire.

Although only one embodiment of the present invention has been described herein, it should be apparent to those skilled in the art that the present invention may be embodied in many other specific forms without departing from the spirit or scope of the invention. Particularly, it should be understood that the invention may be adapted to a circuit which adjusts the levels of image signals of the three primary colors of red (R), green (G) and blue (B) or the levels of image signals of their complementary colors as well as the levels of image signals of the G, Ye and Cy color components.

Therefore, the present examples and embodiment are to be considered as illustrative and not restrictive and the invention is not to be limited to the details given herein, but may be modified within the scope of the appended claims.

What is claimed is:

1. A level adjusting circuit for continuously receiving a plurality of image signals corresponding to a plurality of color components and for adjusting levels of said plurality of image signals color component by color component, comprising:

a color distributor for distributing said received plurality of image signals in accordance with the color components;

a multiplier for multiplying said distributed image signals by specific gains to average the levels of said distributed image signals;

a level clipping circuit for clipping said gain-multiplied image signals in such a way that levels of said gain-multiplied image signals become less than or equal to a predetermined level, each of said gain-multiplied image signals to be subjected to the level clipping having a saturation level greater than or equal to said predetermined level;

an arithmetic operation circuit for performing an arithmetic operation to subtract said predetermined level from one of said gain-multiplied image signals corresponding to one of the plurality of color components and to multiply a resultant value by a predetermined coefficient, said arithmetic operation circuit receives from said multiplier said gain-multiplied image signal having a saturation level higher than said predetermined level from among said gain-multiplied image signals; and an adder for adding an operation result from said arithmetic operation circuit to said level clipped image signals from said level clipping circuit.

2. The level adjusting circuit according to claim 1, wherein said predetermined coefficient is set equal to or smaller than 1.

3. The level adjusting circuit according to claim 1, wherein said predetermined level is set to the lowest one of the saturation levels of said image signals.

4. The level adjusting circuit according to claim 1, wherein said arithmetic operation circuit selects the one of said gain-multiplied image signals that has the lowest signal level before multiplication by one of said specific gains, as said gain-multiplied image signal having a saturation level higher than said predetermined level.

5. The level adjusting circuit according to claim 1, further comprising an under-flow circuit, connected between said arithmetic operation circuit and said adder, for determining whether said operation result is a positive value or a negative value, and wherein said under-flow circuit supplies said operation result to said adder when said operation result is the positive value and inhibits supply of said operation result to said adder when said operation result is the negative value.

6. The level adjusting circuit according to claim 1, further comprising a multiplexer, connected to said multiplier, said level clipping circuit and said arithmetic operation circuit, for multiplexing image signals respectively multiplied by respective specific gains and for supplying multiplexed image signals to said level clipping circuit and said arithmetic operation circuit.

7. An image signal level adjusting circuit for receiving a series of image signals corresponding to different color components and for performing adjustment of signal levels of said image signals in order to average the signal levels, comprising:

a color distributor for distributing the series of image signals into respective image signals in accordance with the color components;

a multiplier for multiplying each of said distributed image signals by a specific gain for the image signal;

a level clipping circuit, coupled to said multiplier, for performing level clipping of the gain-multiplied image signals to a predetermined level, each of said gain-multiplied image signals to be subjected to the level clipping having a saturation level greater than or equal to said predetermined level;

an arithmetic operation circuit for selectively receiving one of the gain-multiplied image signals having a saturation level higher than said predetermined level, and for performing an arithmetic operation to subtract said predetermined level from the signal level of the received gain-multiplied image signal to calculate an excess signal level and to multiply a resultant value by a predetermined coefficient being set equal to or smaller than 1; and an adder, coupled to said level clipping circuit and to said arithmetic operation circuit, for adding said excess signal level to each gain-multiplied image signal supplied from said level clipping circuit, while said excess signal level is a positive value.

8. A level adjusting circuit for continuously receiving a plurality of image signals corresponding to a plurality of color components and for adjusting levels of said plurality of image signals color component by color component, comprising:

a color distributor for distributing said received plurality of image signals in accordance with the color components;

a multiplier for multiplying said distributed image signals by specific gains to average the levels of said distributed image signals;

a level clipping circuit for clipping said gain-multiplied image signals in such a way that levels of said gain-multiplied image signals become less than or equal to a predetermined level, each of said gain-multiplied image signals to be subjected to the level clipping having a higher level than said predetermined level;

one arithmetic operation circuit for performing an arithmetic operation to subtract said predetermined level from a selected one of said gain-multiplied image signals corresponding to one of the plurality of color components and to multiply a resultant value by a predetermined coefficient, said selected gain-multiplied image signal having a saturation level higher than said predetermined level; and an adder for adding an operation result from said arithmetic operation circuit to each of said level clipped image signals from said level clipping circuit.

9. An image signal level adjusting circuit for receiving a series of image signals corresponding to different color components and for performing adjustment of signal levels of said image signals in order to average the signal levels, comprising:

a color distributor for distributing the series of image signals into respective image signals in accordance with the color components;

a multiplier for multiplying each of said distributed image signals by a specific gain for the image signal;

a level clipping circuit, coupled to said multiplier, for performing level clipping of the gain-multiplied image signals to a predetermined level, each of said gain-multiplied image signals to be subjected to the level clipping having a higher level than said predetermined level;

an arithmetic operation circuit for selectively receiving one of the gain-multiplied image signals, the one signal having a saturation level higher than said predetermined level, said arithmetic circuit performing an arithmetic operation to subtract said predetermined level from the signal level of the one received gain-multiplied image signal to calculate an excess signal level and to multiply the excess signal level by a predetermined coefficient that is smaller than 1; and an adder, coupled to said level clipping circuit and to said arithmetic operation circuit, for adding the product of said excess signal level and said predetermined coefficient to each gain-multiplied image signal supplied from said level clipping circuit, while said product is a positive value.

\* \* \* \* \*